(12) United States Patent
Alkan et al.

(10) Patent No.: US 12,293,401 B2
(45) Date of Patent: May 6, 2025

(54) AUTOMATICALLY GENERATING PERSONALIZED AND CONTEXT-AWARE EXPLANATION FORMATS FOR A RECOMMENDATION

(71) Applicant: International Business Machines Corporation, Armonk, NY (US)

(72) Inventors: Oznur Alkan, Clonsilla (IE); Elizabeth Daly, Dublin (IE); Bei Chen, Blanchardstown (IE); Massimiliano Mattetti, Dublin (IE); Rahul Nair, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 18/050,135

(22) Filed: Oct. 27, 2022

(65) Prior Publication Data
US 2024/0144346 A1 May 2, 2024

(51) Int. Cl.
G06Q 30/00 (2023.01)
G06Q 30/0601 (2023.01)
G06F 16/248 (2019.01)

(52) U.S. Cl.
CPC ....... *G06Q 30/0631* (2013.01); *G06F 16/248* (2019.01)

(58) Field of Classification Search
CPC .............................................. G06Q 30/06–08
See application file for complete search history.

(56) References Cited

U.S. PATENT DOCUMENTS

| 7,860,811 | B2 | 12/2010 | Flinn et al. | |
| 9,449,106 | B2 | 9/2016 | Reese et al. | |
| 11,257,144 | B1* | 2/2022 | Hamel | G06Q 30/0631 |
| 2017/0161818 | A1 | 6/2017 | Jain et al. | |
| 2018/0182015 | A1* | 6/2018 | Su | G06N 20/10 |
| 2020/0012681 | A1* | 1/2020 | McInerney | G06F 16/639 |
| 2020/0167834 | A1* | 5/2020 | Matsuoka | G06Q 30/0278 |

FOREIGN PATENT DOCUMENTS

CN 109885776 A 6/2019

OTHER PUBLICATIONS

Arya et al. "One explanation does not fit all: A toolkit and taxonomy of ai explainability techniques." arXiv preprint arXiv:1909.03012 (2019). 18 pages.

(Continued)

*Primary Examiner* — Ethan D Civan
(74) *Attorney, Agent, or Firm* — CANTOR COLBURN LLP; Jordan Schiller

(57) ABSTRACT

Embodiments of the invention are directed to a computer-implemented method. A non-limiting example of the computer-implemented method includes accessing, using an explanation generator module of a processor system, information of a recommendation associated with an application, information of the application, and information of a user of the application. The explanation generator module of the processor system is used to determine an explanation format of an explanation of the recommendation based at least in part on the information of the recommendation associated with the application, the information of the application, and the information of the user of the application.

20 Claims, 11 Drawing Sheets

(56) References Cited

OTHER PUBLICATIONS

Jung et al. "An information-theoretic approach to personalized explainable machine learning." IEEE Signal Processing Letters 27 (2020): 825-829.

Kouki et al. "Personalized explanations for hybrid recommender systems." Proceedings of the 24th International Conference on Intelligent User Interfaces. 2019. 12 pages.

Li et al. "A Contextual-Bandit Approach to Personalized News Article Recommendation." arXiv preprint arXiv:1003.0146 (2010). 10 pages.

Lu et al. "Contextual multi-armed bandits." Proceedings of the Thirteenth international conference on Artificial Intelligence and Statistics. JMLR Workshop and Conference Proceedings, 2010. 8 pages.

Luo et al. "Hybrid Deep Embedding for Recommendations with Dynamic Aspect-Level Explanations." arXiv preprint arXiv:2001.10341 (2020). 10 pages.

Mast et al. "Different approaches to build multilingual conversational systems." International Conference on Text, Speech and Dialogue. Springer, Berlin, Heidelberg, 2002. 7 pages.

Sokol et al. "One Explanation Does Not Fit All: The Promise of Interactive Explanations for Machine Learning Transparency." KI-Künstliche Intelligenz 34.2 (2020): 235-250.

Srivastava et al. "A Reference Architecture for Applications with Conversational Components." 2019 IEEE 10th International Conference on Software Engineering and Service Science (ICSESS). IEEE, 2019. 27 pages.

Tintarev et al. "Designing and evaluating explanations for recommender systems." Recommender systems handbook. Springer, Boston, MA, 2011. 479-510.

Tintarev. "Explanations of recommendations." Proceedings of the 2007 ACM conference on Recommender systems. 2007. 4 pages.

Tsai. "Controllability and explainability in a hybrid social recommender system." Diss. University of Pittsburgh, 2019. 197 pages.

Zafari et al. "ReEx: An integrated architecture for preference model representation and explanation." Expert Systems with Applications 161 (2020): 113706. 17 pages.

* cited by examiner

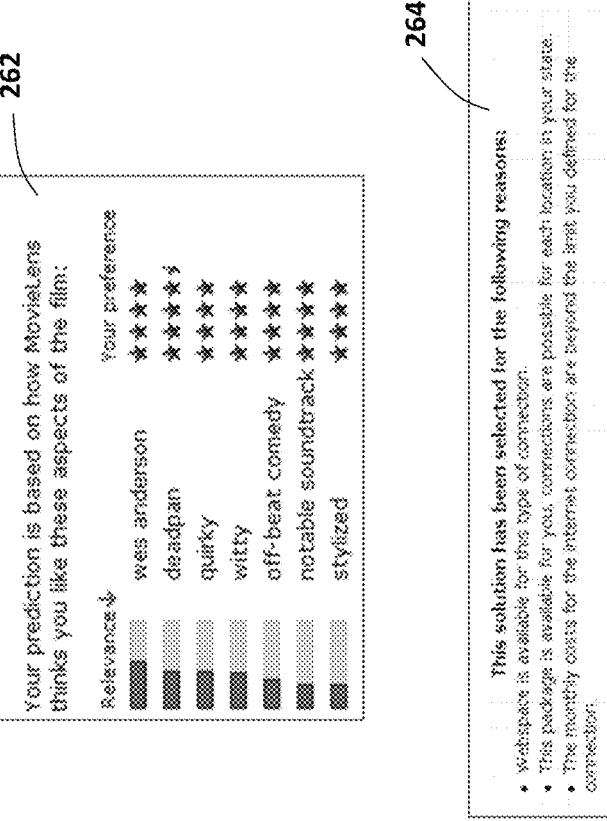
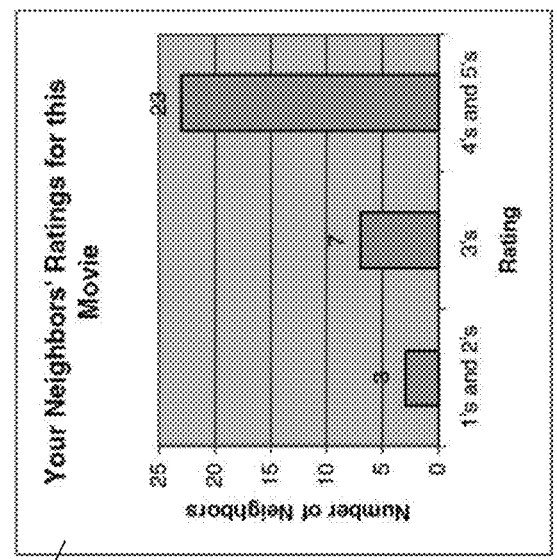
FIG. 2B

S1. User-A performs an action in the application that causes the recommender 140 to generate an initial recommendation having an underlying explanation.

S2. Interaction Manager 210 calls Recommender 140 to receive recommendations for User-A.

S3. Interaction Manager 210 calls the Explanation Generation module 220 to predict an explanation format (EF) based at least in part on any combination of information of the application, the recommendation, the explanation, and/or the user.

S4. Explanation Generation module 220 calls the Explainers module 240 and the Visualizations module 250 to search for and extract explainer components and/or visual components that match the predicted EF. The extracted explainer components and/or visual components, along with information of the recommendations and the explanation, are used to generate explanation/visualization pairs for the recommended items.

S5. Explanation Generation module 220 returns the explanation/visualization pairs generated at S4 to the Interaction Manager 210.

S6. Interaction Manager module 210 presents recommendations and explanation (or explanations/visualization pairs) to User-A.

S7. User-A takes an action (i.e., gives feedback) in response to the recommendations and explanation (or explanations/visualization pairs).

S8. Interaction Manager 210 updates the Feedback Database 230 based on the feedback received from User-A at S7.

FIG. 3

AUTOMATICALLY GENERATING PERSONALIZED AND CONTEXT-AWARE EXPLANATION FORMATS FOR A RECOMMENDATION

BACKGROUND

The present invention relates in general to programmable computers. More specifically, the present invention relates to computing systems, computer-implemented methods, and computer program products operable to automatically generate personalized and context-aware explanation formats for a recommendation generated by a recommender system or engine.

Recommender systems or engines are algorithms used to suggest relevant items to users of a variety of computer-based applications, including, for example, streaming news/information/entertainment services, e-commerce applications, social media platforms, and the like. The suggestions typically are designed to assist and/or influence various decision-making processes, such as what product to purchase, what music to listen to, or what online news to read. Recommender systems are useful when an individual needs to choose an item from a potentially overwhelming number of items that an application or service offers.

Recommender systems can generate explanations that provide the user with a reason why the recommendation is being made. For example, if a user uses a streaming movie application to watch Movie A, the streaming movie application can generate and display a list of recommended movies (e.g., Movies B-G) to the user accompanied by an explanation of why the movies are being recommended to the user. An example explanation is "Because you watched Movie A, we thought you might like these movies." Where Movie A falls within a particular genre, for example, western movies, another example explanation is "The following movies are popular with viewers who enjoy western movies."

SUMMARY

Embodiments of the invention are directed to a computer-implemented method. A non-limiting example of the computer-implemented method includes accessing, using an explanation generator module of a processor system, information of a recommendation associated with an application, information of the application, and information of a user of the application. The explanation generator module of the processor system is used to determine an explanation format of an explanation of the recommendation based at least in part on the information of the recommendation associated with the application, the information of the application, and the information of the user of the application.

Embodiments of the invention are also directed to computer systems and computer program products having substantially the same features as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 2B depicts examples of visualization components that can be used in accordance with embodiments of the invention;

FIG. 3 depicts a flow diagram illustrating a computer-implemented method in accordance with embodiments of the invention;

Figure 1:
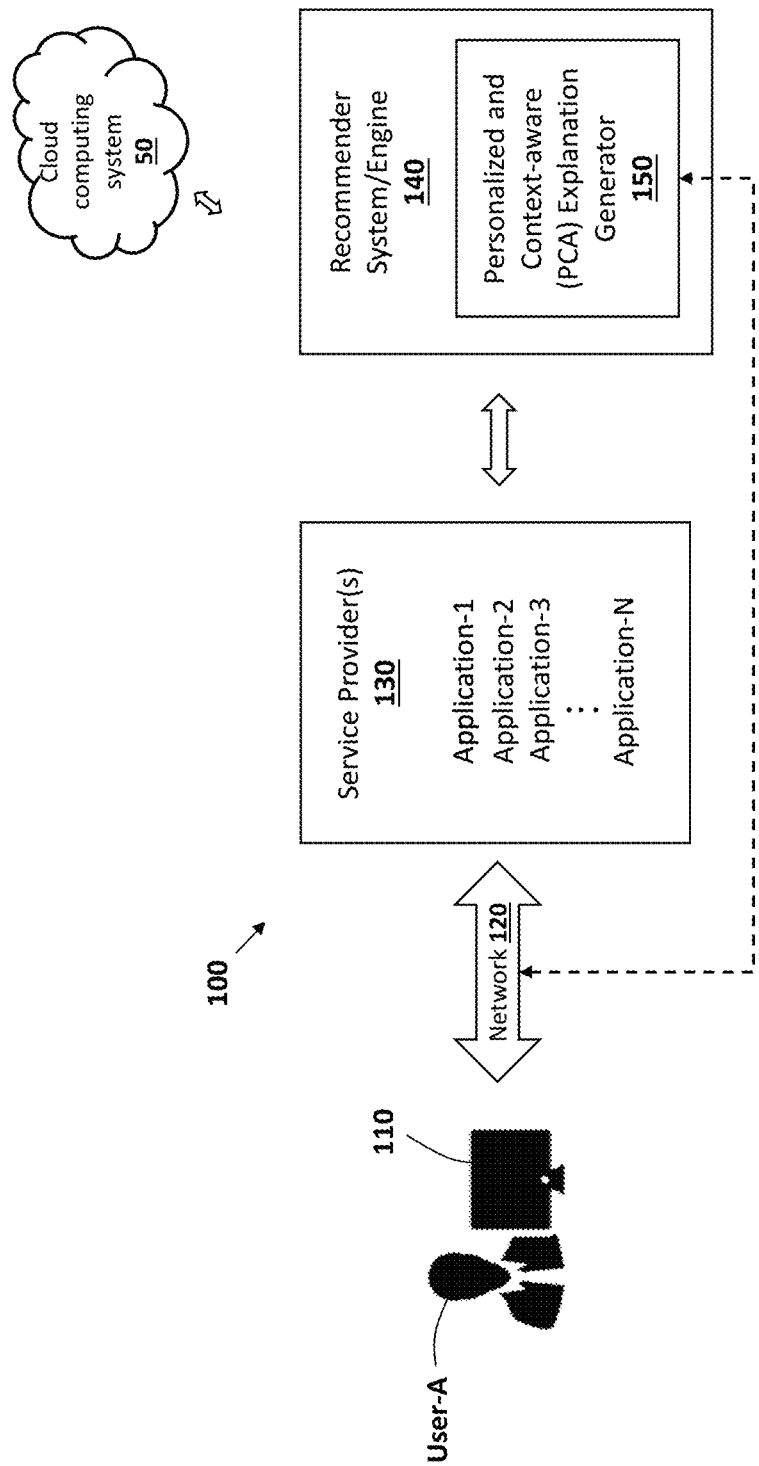
FIG. 1 depicts a simplified block diagram illustrating a system in accordance with embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

Many of the functional units of the systems described in this specification have been labeled as models. Embodiments of the invention apply to a wide variety of model implementations. For example, the models described herein can be implemented as machine learning algorithms and natural language processing algorithms configured and arranged to uncover unknown relationships between data/information and generate a model that applies the uncovered relationship to new data/information in order to perform an assigned task of the model. In aspects of the invention, the models described herein can have all of the features and functionality of the models depicted in FIGS. 5, 6, and 7, which are described in greater detail subsequently herein.

Turning now to an overview of technologies that are relevant to aspects of the invention, as previously noted herein, recommender systems can generate explanations that accompany their recommendations and provide a reason why the recommendation is being made. For example, if a user uses a streaming movie application to watch Movie A, the streaming movie application can generate and display a list of recommended movies (e.g., Movies B-G) to the user accompanied by an explanation of why the movies are being recommended to the user.

Known recommendation/explanation systems have shortcomings. For example, application developers generally set the recommendation/explanation features during application development based on ad hoc assessments of the recommendation/explanation features that will be most effective for the application-owner's particular goals for the recommendation system. For example Application Owner A may be an e-commerce company that wants to increase sales in a particular product line, so the goal of Application Owner A's recommendation/explanation features may be to persuade as many application users as possible toward the particular product line. As another example, Application Owner B may be a video streaming service that wants to increase its user experience (UE) and/or quality of experience (QoE) scores among its subscribers, so the goal of its recommendation/explanation features may be to provide recommendations/explanations that the application user finds highly useful and that increase the application user's UE and/or QoE. UE and QoE are often used interchangeably. In general, QoE is a measure of the delight or annoyance a user experiences when utilizing a service such as web browsing, phone calls, TV broadcasts, and the like.

Currently, there is no systematic and reliable method that moves beyond known ad hoc, a priori methods of selecting the format types and component options for recommendation explanations of a given application.

Turning now to an overview of aspects of the invention, embodiments of the invention address the above-described shortcomings by providing computing systems, computer-implemented methods, and computer program products operable to automatically generate personalized and context-aware explanation formats (e.g., collaborative-based, content-based, demographics-based, pattern-based, knowledge/utility-based, why-not type explanations, etc., and combinations thereof) and/or component options (e.g., natural language, diagrams, video, audio, etc., and combinations thereof) for a recommender system or engine. More specifically, embodiments of the invention provide computing technologies that automatically and dynamically match the format/type of a recommendation explanations to the application/recommendation the explanation is intended to illuminate; the goals/needs of the application owner; and/or the preferences and priorities of the application user.

In embodiments of the invention, examples of collaborative-based explanation formats/types include "Users who watched this movie also watched . . . ". In embodiments of the invention, examples of content-based explanation formats/types include "Based on what you've told us so far, we're recommending Movie A because . . . ". In embodiments of the invention, examples of demographics-based explanation formats/types include "We recommended the Movie A because Movie A is a military movie and you served in the U.S. military." In embodiments of the invention, examples of pattern-based explanation formats/types include "12% of people who watched Movie A watched Movie B afterwards." In embodiments of the invention, examples of knowledge and utility-based explanation formats/types include "Miss Congeniality differs from you query only in its IMDB rating and you can rent it for $9.00 with your membership." In embodiments of the invention, examples of why-not explanations formats/types include "I recommend Movie A and not Movie B because although you like the main actor in Movie B, Movie B is a fantasy and you do not like fantasies." Users who watched this movie also watched . . . ". In embodiments of the invention, known explanation formats/types can be modified or combined to generate an explanation format/type provide that is predicted (e.g., by the explanation generator) to be accepted by the user.

Embodiments of the invention support an observation by the present inventors that different applications/recommendations pairs can require different types (e.g., format and/or content) of explanations and different users will prefer different explanation styles (text, audio, visual, and combinations thereof). For example, embodiments of the invention automatically and dynamically identify situations where an effective explanation format/type and component combination for a job recommendation generated by a job-search application for a given type of job, a given application owner, and/or a given user (or job seeker) is a recommendation explanation format/type and component combination that communicates how the user's skills overlap with the job requirements using a combination of natural language text and a visualization diagram. In accordance with aspects of the invention, the "effectiveness" of the explanation format/type and generated using embodiments of the invention can be evaluated based at least in part on a likelihood that the user will accept and act on the recommendation (e.g., watch the recommended movie or purchase the recommended product). As another example, embodiments of the invention automatically and dynamically identify situations where an effective explanation format/type and component combination for a job recommendation generated by a given application for a given type of job recommendation, a given application owner, and/or a given user (or job seeker) is a recommendation explanation format/type and component combination that communicates how the user's skills overlap with the job requirements, and that provides multiple reasons (in addition to the skill/requirements overlap) why the job is being recommended. As another example, embodiments of the invention automatically and dynamically recognize situations where a less rigorous explanation format/type and component combination is appropriate. For example, embodiments of the invention automatically and dynamically identify situations (e.g., a movie recommendation) where a less rigorous explanation format/type and component combination is preferred (e.g., less rigorous than a job recommendation) so selecting a relatively simple explanation format/type and component combination (e.g., "Because you watched Movie A, we thought you might like these movies") is both sufficient and preferred. As another example, embodiments of the invention automatically and dynamically recognize situations where some users are more persuaded by an explanation format/type and component combination that is based on the overlap of the recommendation with previous movies viewed whereas other users are more influenced by an explanation format/type and component combination that is based on the overlap of the recommendation with viewing behaviors in their social network. In such situations, embodiments of the invention automatically and dynamically select the appropriate explanation format/type and component combination for users who are more persuaded based on the overlap of the recommendation with previous movies viewed, and automatically and dynamically select the appropriate explanation format/type and component combination for users who are more influenced by recommendations that overlap with the viewing behaviors in their social network. Thus, embodiments of the invention avoid the need for application developers to use ad hoc methods of a priori selecting explanation format/type and component combinations that will be used by a given application. In accordance with aspects of the invention, the embodiments of the invention described herein are operable to generate an explanation format/type, an explanation component, and/or an explanation format/type and component combination.

Embodiments of the invention provide a recommender system/engine having a novel personalized and context-aware (PCA) explanation generator in accordance with aspects of the invention. In some embodiments of the invention, the PCA explanation generator includes an interaction manager module, an explanation generator module, and a user feedback database communicatively coupled to one another. The explanation generator module is further communicatively coupled to an explainers repository and a visualizations repository. The user feedback database can be implemented as a searchable database operable to store user feedback (or reactions) about explanation formats/types and component combinations presented to a user by the interaction manager module. The explainers repository can be implemented as a searchable repository (or database) operable to store various explanation format/types. The visualizations repository can be implemented as a searchable repository (or database) operable to store various explanation components.

In embodiments of the invention, the interaction manager module is operable to receive a stream of recommendation/explanation pairs from a recommender system/engine and route the same to the explanation generator. In embodiments of the invention, the explanation generator can include a machine learning (ML) algorithm operable to receive the stream of recommendation/explanation pairs from the interactions manager module. The ML algorithm is trained to perform the task of automatically and dynamically generating a format/type and component combination (or a format/type alone) for the received explanation. In some embodiments of the invention, the format/type and component combination is generated by selecting from the explainers repository and the visualizations repository. In some embodiments of the invention, the format/type and component combination is generated by creating a format/type and component combination that is not one of the options available in the explainers repository and the visualizations repository. For example, in some embodiments of the invention, the ML algorithm can generate the format/type and component combination by selecting from the explainers repository and the visualizations repository and making modifications to the same to arrive at the generated format/type and component combination. In accordance with embodiments of the invention, the ML algorithm is trained to perform the task of automatically and dynamically generating a format/type and component combination (or a format/type alone) for the received explanation based at least in part on information of the recommendation associated with the application, information of the application, and information of a user of the application. In embodiments of the invention, the ML algorithm is further trained dynamically based on real time reactions (or feedback) of users to the explanation formats/types and component combinations generated and presented to users by the explanation generator module and the interactions manager module. Thus, in addition to general information of users (e.g., static user profile information), embodiments of the invention gather real time feedback that enables the ML algorithm to refine generated explanation formats/types and component combination to evaluate in real time whether or not explanation format/type and component combinations are meeting the goals/interests of application owners and make adjustments to generated explanation format/type and components combinations in real time when needed.

In some embodiments of the invention, user feedback on generated explanation format/type and component combinations can be gathered passively based on user reactions to the generated explanation format/type and component combinations. For example, a passive user reaction can be registered when a user ignores all of the generated explanation format/type and component combinations, selects additional information on some of the generated explanation format/type and component combinations, or actually accepts the generated explanation format/type and component combinations (e.g., watches the recommended movie, or purchases the recommended item). In some embodiments of the invention, user feedback on generated explanation format/type and component combinations can be gathered proactively by incorporating a dialogue system or virtual assistant (VA) or conversation agent (CA) in the interaction manager module. A VA/CA is a computer system operable to communicate with a human using a coherent structure. VA/CA systems can employ a variety of communication mechanisms, including, for example, text, speech, graphics, haptics, gestures, and the like for communication on input and output channels. VA/CA systems can employ various forms of natural language processing (NLP), which is a field of computer science, artificial intelligence, and computational linguistics concerned with the interactions between computers and humans using language. The VA/CA system can run an interaction loop with a user to gather feedback on why a generated explanation format/type and component combinations was accepted, partially accepted, or rejected by the user.

In some embodiments of the invention, the ML algorithms of the interaction manager module can be implemented as a contextual multi-armed bandit (CMAB) algorithm. CMAB algorithms are a form of reinforcement learning. In general, reinforcement learning techniques can be categorized as behavioral learning models. The reinforcement learning algorithm receives feedback from the analysis of the data so the user is guided to the best outcome. Reinforcement learning differs from other types of supervised learning because the system isn't trained with the sample data set. Rather, the system learns through trial and error. Therefore, a sequence of successful decisions will result in the process being "reinforced" because it best solves the problem at hand.

In general, a CMAB algorithm is an online learning solution that chooses, based on a given context (side information), an action from a set of possible actions in order to maximize the total payoff of the chosen actions. The payoff depends on both the action chosen and the context. In embodiments of the invention, any combination of the explanation format/type from the explainers repository and the explanation component from the visualizations repository can be considered an "action." The passive/active user feedback, the information of the recommendation associated with the application, the information of the application, and the information of the user of the application can be modeled as "context" of the CMAB algorithm. In embodiments of the invention, any feedback a user provides related to the context can be stored as part of context data. For example, if a user does not like a visual explanation for some specific recommended items, this can be stored as part of context data so that the learner component of the CMAB algorithm can use it. Users can score the generated explanation format/type and component combinations, and this score can be considered as the reward/payoff for the CMAB algorithm.

Accordingly, embodiments of the invention automatically and dynamically generate different explanation formats/types and component combinations then automatically learns which generated explanation format/type and component combinations are most appropriate not just for the given application but also for the specific user. Embodiments of the invention dynamically and automatically interact with the users to understand whether or not the generated explanation format/type and component combination satisfies the user's needs; ask for the reasons for why the explanation is or is not acceptable for the user's needs; and manage an interaction loop until the interaction manager module system finds an explanation that suit the users' interests or the system runs out of generated explanation format/type and component combination options. In accordance with aspects of the invention, the embodiments of the invention described herein are operable to generate an explanation format/type, an explanation component, and/or an explanation format/type and component combination.

Turning now to a more detailed description of the aspects of the present invention, FIG. 1 depicts a simplified block diagram illustrating a system 100 in accordance with embodiments of the invention. The system 100 includes one or more service providers 130 communicatively coupled to a recommender system/engine 140. The service providers 130 represent a variety of different service providers that deploy a variety of different software applications, which are identified in FIG. 1 as Application-1, Application-2, and Application-3 through Application-N, where N is any whole number greater than three (3). Thus, each of Application-1 through Application-N represents a service provided by any one of the service providers 130. For example, Application-1 could implement an online video streaming service, and Application-2 could implement an e-commerce on-line store. User-A uses a programmable computing system 110 to access one or more of Application-1 through Application-N by downloading the application over a network 120 (e.g., the Internet) or by connecting through the network 120 to a website that hosts the relevant application. In accordance with aspects of the invention, and as described in greater detail subsequently herein, User-A can also access a personalized context-aware (PCA) explanation generator module 150 of the recommender system/engine 140 either through the application (e.g., Application-1) or through a direct connection as depicted by the dotted line bi-directional arrow connecting the network 120 to the PCA explanation generator module 150.

A cloud computing system 50 is in wired or wireless electronic communication with the system 100. The cloud computing system 50 can supplement, support or replace some or all of the functionality of the various components of the system 100. Additionally, some or all of the functionality of the system 100 can be implemented as a node of the cloud computing system 50. Additional details of cloud computing features of embodiments of the invention are depicted by the computing environment 800 shown in FIG. 8 and described in greater detail subsequently herein.

The recommender system/engine 140 uses ML algorithms, natural language processing, and statistical modeling (not shown separately from the recommender system/engine 140) to recommend relevant items associated with any one of Application-1 through Application-N to User-A. The recommendations typically are designed to assist and/or influence various decision-making processes, such as what product to purchase, what music to listen to, or what online news to read. In e-commerce applications, the recommendation system/engine 140 can be used to segment partner website visitors into cohorts and target them with relevant product and content suggestions. There are several categories of recommendation systems, and the recommendation system/engine 140 can be implemented in manner that falls into any one of the categories, including, for example, collaborative filtering systems, content-based systems or hybrid systems. Content-based recommendation systems/engines base predictions around end user interest for a specific content item. When a content item has been acted upon, the system/engine uses metadata to identify and recommend similar content items. This type of recommendation system/engine is commonly used by news websites. Collaborative recommendation systems/engines analyze end user behavior within a specific platform to make predictions about a specific end user or cohort. This type of recommender system can be memory-based or model-based and is commonly used by e-commerce websites. Hybrid recommendation systems/engines compensate for the limitations of content-based and collaborative models by using both metadata and transactional data to suggest future actions. Hybrid engines can analyze what digital content an end user has acted upon previously and recommend similar content, while also factoring in demographics and historical data generated by users with similar interests.

The recommender system/engine 140 further includes known explanation-generating functionality that generates explanations of the reasoning that led to the recommendations. The known explanation-generating functionality, in addition to generating the explanation itself, also generates underlying rationales, supporting data, and/or the analysis methodologies that were used to generate the explanation. Because such explanations are not generated in accordance with aspects of the invention, they will be referred to as non-PCA explanations, and the underlying rationales, supporting data, and/or the analysis methodologies that were used to generate the non-PCA explanation will be referred to herein as non-PCA information of the non-PCA explanations. The recommender system/engine 140 may or may not provide the non-PCA explanations in a particular format/type. In known recommendation/explanation systems/engines, software application developers generally set the format/type of the application's recommendation/explanation pairs during application development.

Embodiments of the invention modify the recommendation and explanation functionality of the recommender system/engine 140 to incorporate the PCA explanation generator module 150 embodying aspects of the invention. The PCA explanation generator module 150 automatically and dynamically selects personalized and context-aware explanation formats/types for the non-PCA explanations generated by the recommender system/engine 140. More specifically, in accordance with embodiments of the invention, the PCA explanation generator module 150 uses various computing technologies to automatically and dynamically match the non-PCA explanations to an explanation format/type that is predicted or generated based on a variety of context-aware factors and personalized factors. The context-aware factors (e.g., context information 202 shown in FIG. 2A) take into account the application/recommendation the explanation is intended to illuminate, and the personalized factors (e.g., the contents of the user feedback database 230 shown in FIG. 2A) take into account the preferences and priorities of User-A.

Figure 2A:
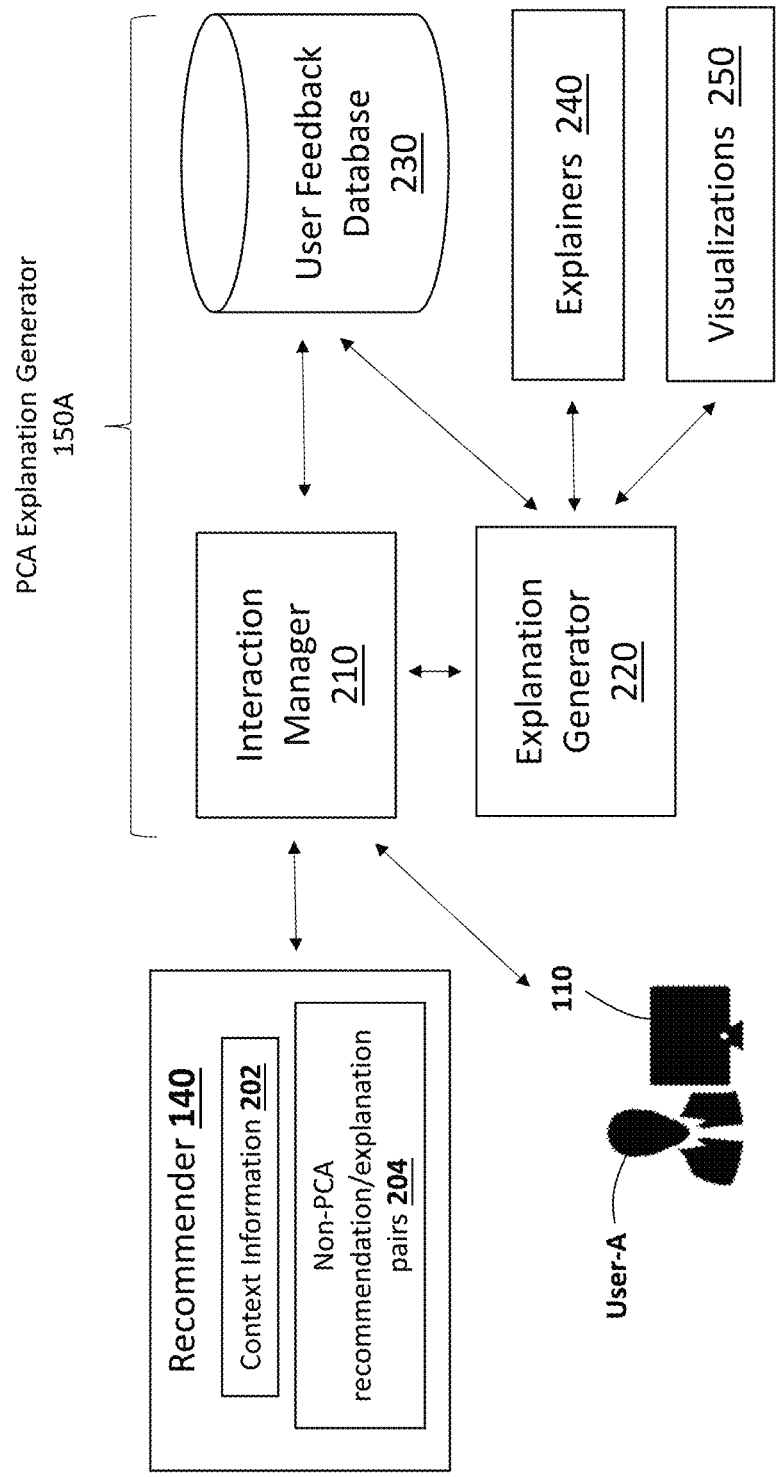
FIG. 2A depicts a simplified block diagram illustrating a system in accordance with embodiments of the invention.
Figure 2C:
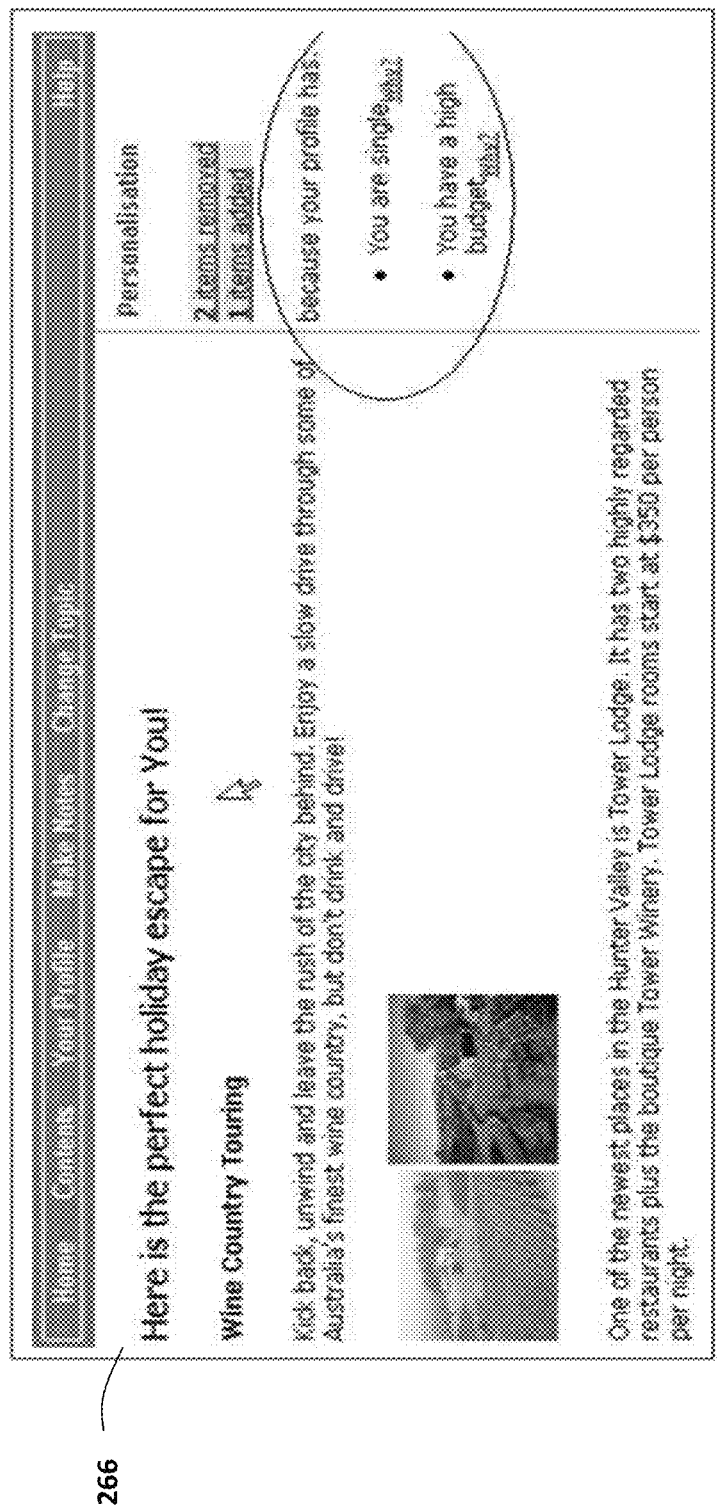
FIG. 2C depicts another example of a visualization component that can be used in accordance with embodiments of the invention.

In embodiments of the invention, the PCA explanation generator 150 can include one or more ML algorithms (including natural language processing capabilities) operable to receive a stream of recommendation/explanation pairs from the recommender system/engine 140. The ML algorithms of the PCA explanation generator 150 is trained to automatically and dynamically predict a suitable explanation format/type based on an analysis of context information 202 (shown in FIG. 2A) and user feedback (statically gathered and dynamically gathered) stored in a user feedback database 230 (shown in FIG. 2A). In embodiments of the invention, the context information 202 includes information of the relevant application, information of the relevant recommendations, and information of the relevant explanation. The PCA explanation generator 150 uses the predicted explanation format/type to generate explanation format/type and component combinations by selecting from an explainers repository 240 (shown in FIG. 2A) and a visualizations repository 250 (shown in FIG. 2A) to form a PCA explanation in accordance with embodiments of the invention. In accordance with aspects of the invention, the explanation format/type in the explainers repository 250 can include collaborative-based explanation formats/types, content-based explanation formats/types, demographics-based explanation formats/types, pattern-based explanation formats/types, knowledge/utility-based explanation formats/types, why-not type explanation formats/types, and combinations thereof. In accordance with aspects of the invention, the component options in the visualizations repository 250 can include various combinations of natural language, diagrams, charts, tables, video, audio, etc., and combinations thereof. Examples of components options are depicted in FIGS. 2B and 2C and identified as component option 260 (shown in FIG. 2B), component option 262 (shown in FIG. 2B), component option 264 (shown in FIG. 2B), and component option 266 (shown in FIG. 2C). In some embodiments of the invention, the component option can include a news-map, which is a tree-map visualization of news. Different colors are used to represent topic areas, square and font size, to represent importance to the current user, and shades of each topi color represents recency.

In embodiments of the invention, the context information 202 (shown in FIG. 2A) can include information of the application, information of the recommendation associated with the application, and information of the explanation associated with the recommendation. In embodiments of the invention, the personalized information of a user (e.g., User-A) of the application is stored in the user feedback database 230 (shown in FIG. 2A). In embodiments of the invention, the ML algorithm of the PCA explanation generator module 150 is trained initially using the context information 202 and the user feedback information in the user feedback database 230. In embodiments of the invention, the ML algorithm of the PCA explanation generator module 150 is also trained in a dynamic and ongoing fashion based on real time reactions (or feedback) of User-A to the explanation formats and/or components generated and presented to User-A by the PCA explanation generator module 150. Thus, in addition to statically gathered information of User-A (e.g., static user profile information), embodiments of the invention gather real time feedback that enables the ML algorithms of the PCA explanation generator 150 to refine explanation format/type selections to evaluate in real time whether or not explanation formats/types presented to user are meeting the goals/interests of application owners and make adjustments to explanation format/type selections in real time when needed.

The various components/modules/models of the system 100 shown in FIGS. 1, 2A, 4A, and 5 are depicted separately or combined for ease of illustration and explanation. In embodiments of the invention, the functions performed by the various components/modules/models of the system 100 can be distributed differently than shown in FIGS. 1, 2, 4A, and 5 without departing from the scope of the various embodiments of the invention describe herein unless it is specifically stated otherwise. For example, the PCA explanation generator module 150 is depicted in FIG. 1 as a component of the recommender system/engine 140 but could be implemented as a separate component that is electronically connected to the recommender system/engine 140.

FIG. 2A depicts a portion of the system 100 (shown in FIG. 1), where the PCA explanation generator module 150 (shown in FIG. 1) is implemented as a PCA explanation generator module 150A. In embodiments of the invention, the PCA explanation generator module 150A includes an interaction manager module 210, an explanation generator module 220, and a user feedback database 230, configured and arranged as shown. The explanation generator module 220 is further communicatively coupled to an explainers repository 240 and a visualizations repository 250, configured and arranged as shown. The user feedback database 230 can be implemented as a searchable database operable to store user feedback (e.g., responses to machine-generated queries, or data representing whether the user accepted or rejected the recommendation) about the explanation types/formats presented to User-A by the interaction manager module 210. The explainers repository 240 can be implemented as a searchable repository (or database) operable to store various explanation format/types. The visualizations repository 250 can be implemented as a searchable repository (or database) operable to store various explanation components.

Figure 5:
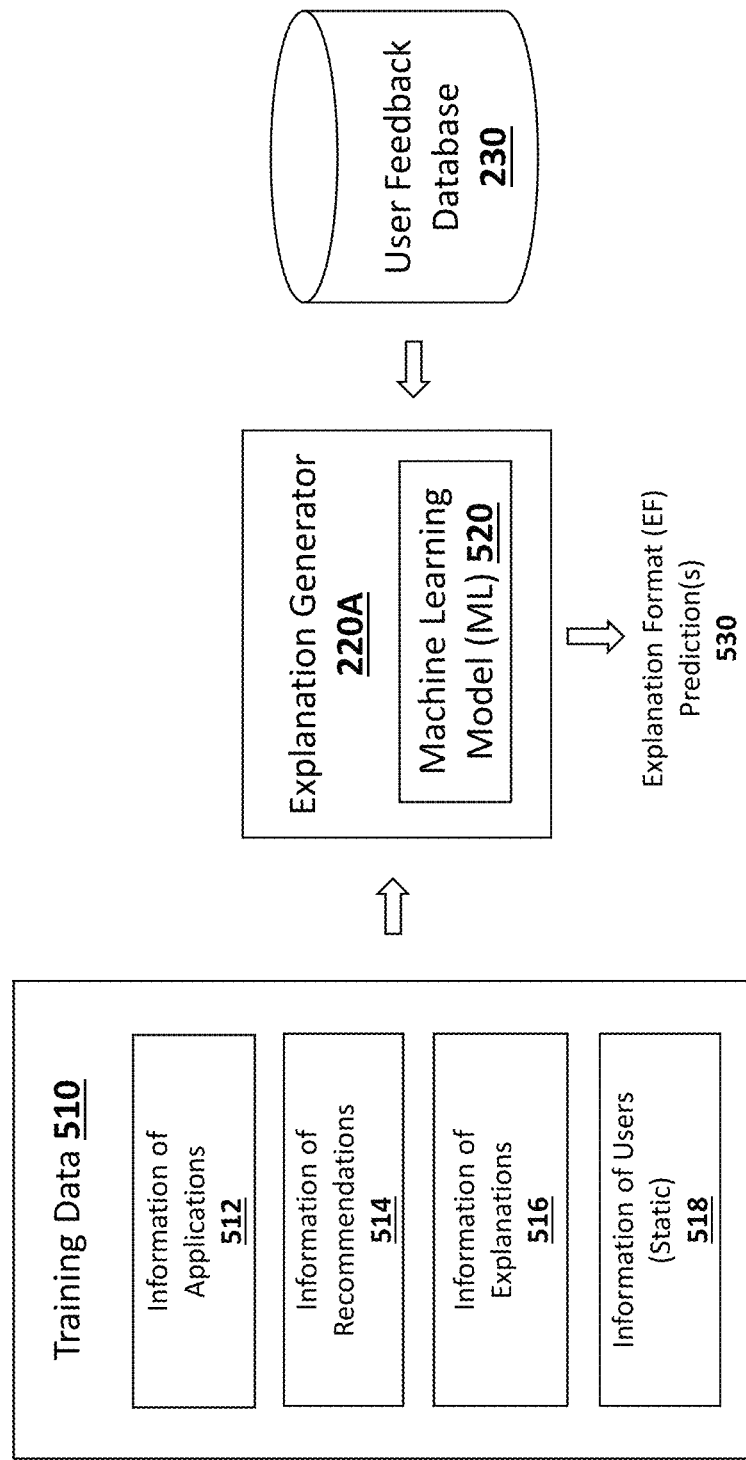
FIG. 5 depicts a machine learning model during training in accordance with embodiments of the invention.

Continuing with FIG. 2A, based on an action by User-A (e.g., User-A finishes watching a streaming movie using Application-1), the interaction manager module 210 receives or accesses context information 202 and non-PCA recommendation/explanation pairs 204 from the recommender system/engine 140 then passes the same to the explanation generator module 220 with a request to predict a PCA explanation format/type (and/or a PCA explanation format/type and component combination). The explanation generator 220 can include ML algorithms trained to implement a ML model (e.g., ML model 520 shown in FIG. 5)

operable to automatically and dynamically predict and generate explanation formats/types by selecting from the explainers repository 240 and predict/generate explanation components by selecting from the visualizations repository 250 to form the PCA explanation having a PCA explanation format. In embodiments of the invention, the predicted/selected PCA explanation format/type can include natural language explanations alone; natural language explanations combined with visualization explanations; or visualization explanations alone. The ML algorithms of the explanation generator 220 automatically and dynamically predict the PCA explanation format/type (and/or the PCA explanation format/type and component combination) based at least in part on information of the recommendation associated with the application, information of the application, and information of User-A. In embodiments of the invention (e.g., as depicted in FIG. 5), the ML algorithms of the explanation generators 220 are trained using the information of the application (e.g., information of applications 512), the information of the recommendation associated with the application (e.g., information of recommendations 514), the information of the explanations (e.g., information of explanations 516), and the information of a User-A (e.g., information of users (statically gathered) 518). In embodiments of the invention, the ML algorithms of the explanation generator 220 are further trained dynamically based on real time reactions (or feedback) of User-A to the PCA explanations predicted and presented to User-A by the interactions manager module 210. Thus, in addition to general information of User-A (e.g., static user profile information), embodiments of the invention gather real time feedback that enables the rage is or ja ML algorithms of the explanation generator 220 to refine explanation generation operations to evaluate (or take in to account) in real time whether or not explanations formats/types (and/or explanation components) are meeting the goals/interests of application owners and make adjustments to explanation selections in real time when needed.

FIG. 3 depicts a computer-implemented method 300 operable to be implemented by the system 100 (shown in FIG. 1) having the PCA explanation generator module 150A (shown in FIG. 2A). The computer-implemented method 300 will now be described with reference to the system 100 having the PCA explanation generator module 150A. The computer-implemented method 300 begins at Step1 (S1) where User-A performs an action in the application (e.g., finishes watching a streaming movie) that causes or prompts the recommender 140 to generate a recommendation having an underlying explanation. The underlying explanation can have an initial format/type or can simply include raw data of the underlying explanation. In embodiments of the invention where the recommender system/engine 140 is not custom-designed to function with the PCA explanation generator module 150A, the underlying explanation that supports the recommendation generated by the recommender 140 has an initial explanation format/type. In embodiments of the invention where the recommender system/engine 140 is custom-designed to function with the PCA explanation generator module 150A, the underlying explanation that supports the recommendation generated by the recommender 140 can simply include raw data of the underlying explanation. At S2, the action performed by User-A also prompts the interaction manager module 210 to call the recommender 140 to receive the recommendations for User-A, along with the underlying explanation(s) that support the recommendations (e.g., non-PCA recommendation/explanation pairs 204 shown in FIG. 2A). In accordance embodiments of the invention, the action performed by User-A also prompts the interaction manager module 210 to call the recommender 140 to receive the context information 202 (shown in FIG. 2A).

At S3, responsive to receiving the recommendations and the underlying explanation(s) that support the recommendations, the interaction manager module 210 calls the explanation generation module 220 to perform operations that predict an explanation format (EF) for the explanations based at least in part on the received recommendations and the associated underlying explanations of the reasons for the recommendations. At S4, responsive to receiving the recommendations and the underlying explanation(s) that support the recommendations from the interaction manager module 210, the explanation generation module 220 performs operations that predict an explanation format (EF) for the explanation based at least in part on the context information 202 (shown in FIG. 2A), which can be any combination of information of the application (e.g., Application-1), information of the received recommendations, and information of the underlying explanations of the reasons for the recommendations. In embodiments of the invention, the explanation generation module 220 also performs operations that predict an explanation format (EF) for the explanation based at least in part on the user feedback stored at the user feedback database 230 (shown in FIG. 2A).

In embodiments of the invention, the information of the application includes details about the purpose, structure, and content of the application. For example, information of the application can include information identifying that the application is a streaming video entertainment application, as well as information identifying the application's ability to support display format types and content. In some embodiments of the invention, the information of the application can include the market priorities of the application as directed by the application owner (e.g., the service provider 130 shown in FIG. 1). An example market priority for one streaming video entertainment application could include prioritizing UE and/or QoE, while an example market priority for another streaming video entertainment application could include directing users toward rent/buy viewing selections instead of viewing selections that are included in the monthly service fee.

In embodiments of the invention, the information of the recommendation includes details about the purpose, structure, and content of the recommendation. For example, information of the recommendation can include whether the recommendation is for a movie, a job, music, books to read, items to purchase, and the like. In embodiments of the invention, the information of the explanation includes details about the purpose, structure, and content of the explanation. For example, information of the explanation can include natural language text that conveys details of the rationale, supporting data, and assumptions underlying the explanation.

In embodiments of the invention, the information of the user includes statically gathered details about the user, including, for example, the typical name, age, occupation, and the like information found in user/customer profiles. In embodiments of the invention, the information of the user can include dynamically gathered user information, examples of which include the user's reactions to various explanations presented to the user through the system 100. Information of the user is stored in the user feedback database 230. Additional details of how information of the user can be gathered dynamically and stored are shown in FIGS. 4A and 4B and described in greater detail subsequently herein.

At S4, the explanation generation module 220 calls the explainers repository 240 and the visualizations repository 250 to search for and extract explainer components and/or visualization components that match the predicted EF. The extracted explainer components and/or visualization components, along with information of the recommendations and the explanation, are used by the module 220 to generate format/type and component combinations for the explanation/visualization pairs of the recommended items. At S5, the explanation generation module 220 returns the format/type and component combinations for the explanation/visualization pairs of the recommended items generated at S4 to the interaction manager module 210. At S6, the interaction manager module 210 presents recommendations and explanation (or explanations/visualization pairs) having the generated format/type and component combinations to User-A. At S7, User-A takes an action (i.e., gives feedback) in response to the recommendations and explanation (or explanations/visualization pairs) having the generated format/type and component combinations. At S8, the interaction manager 210 updates the user feedback database 230 based on the feedback received from User-A at S7.

Figure 4A:
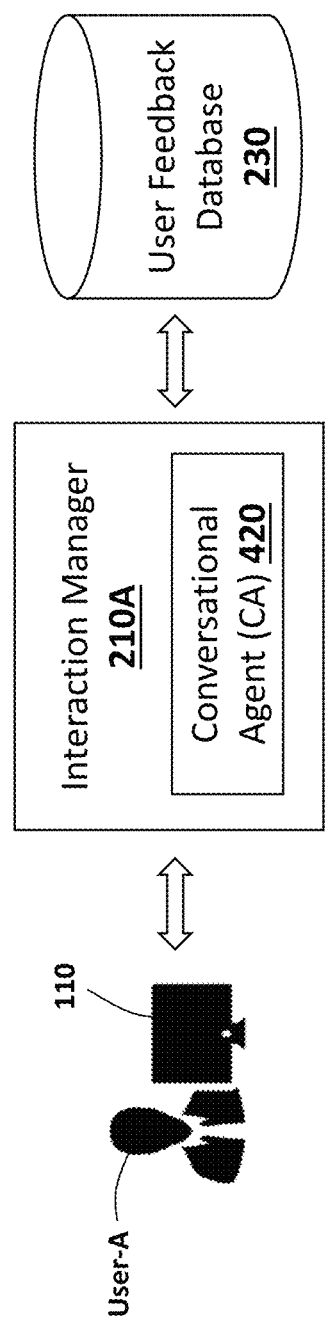
FIG. 4A depicts a simplified block diagram illustrating a system in accordance with embodiments of the invention.
Figure 4B:
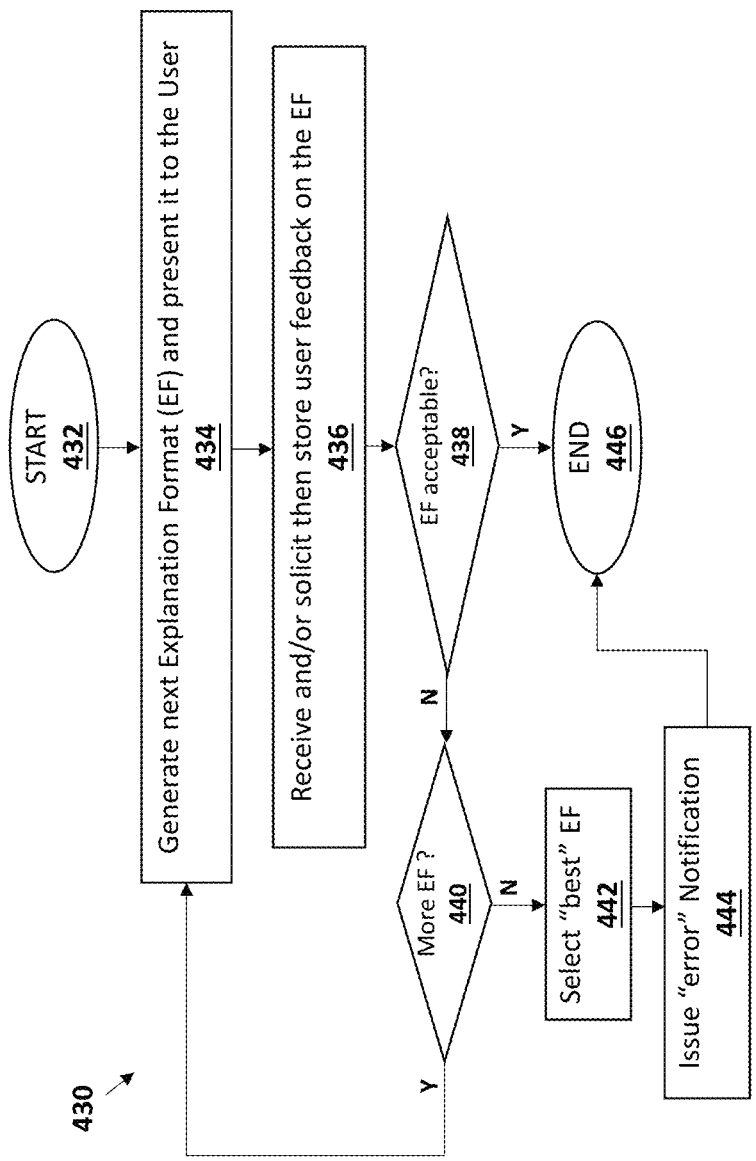
FIG. 4B depicts a flow diagram illustrating a computer-implemented method performed by the system shown in FIG. 4A in accordance with embodiments of the invention.

FIGS. 4A, 4B, and 5 provide additional details of how information of the user (e.g., User-A) can be gathered dynamically and stored in the user feedback database 230 in accordance with aspects of the invention. FIG. 4A depicts a portion of the system 100 (shown in FIG. 1) where the interaction manager module 210 (shown in FIG. 1) is implemented as an interaction manager module 210A operable to include a conversational agent (CA) 420, configured and arranged as shown. FIG. 5 depicts a portion of the system 100 where the explanation generator 220 (shown in FIG. 1) is implemented as an explanation generator 220A operable to include the ML model 520. The operation of the components depicted in FIGS. 2A, 4A and 5 will now be described with reference to the components depicted in FIGS. 2A, 4A, and 5, along with a computer-implemented methodology 430 depicted in FIG. 4B.

As shown in FIG. 4B, the methodology 430 starts at block 432 then moves to block 434 where the explanation generator 220, 220A (shown in FIGS. 2A and 5) generates a next explanation format (EF) and presents it to User-A. At block 436, the methodology 430 uses the interaction manager module 210, 210A to receive (e.g., using module 210) and/or solicit (e.g., using module 210A and CA 420) then store user feedback on the EF. In embodiments of the invention where the CA 420 is used to solicit user feedback on the EF, the interaction between the CA 420 and User-A is a conversational loop between the CA 420 and User-A. In embodiments of the invention, the conversational loop can be implemented as a form of "synchronous conferencing system" (SCS). SCSs describe a class of computer-based communication technologies that are widely used on interactive computing networks (e.g., the Internet) to enable two or more users to communicate with one another in real time. Specifically, a user sends a message (e.g., natural language textual data) to another user through a synchronous conferencing application or computer program of the SCS. The latter user ideally responds to the message within a short period of time, typically seconds or minutes at the most. Thus, SCS technologies facilitate a conversation in which electronic messages are passed back and forth between at least two users.

Messages exchanged through an SCS generally contain textual data. However, some SCS technologies allow the exchange of other types of multimedia content (e.g., audio/video). The messages are typically short in length, though longer messages can be appropriate in certain contexts (e.g., a question/answer exchange). Frequently, multiple messages that are part of the same conversation are exchanged within a so-called SCS session that beneficially groups the related messages together and provides context. The messages are frequently displayed to each user within a window in a graphical user interface (GUI) at the user's local computer display.

The SCS used in accordance with embodiments of the invention to implement the conversational loop includes User-A as one participant, and the CA 420 (or chatbot) as the other participant. In general, the CA 420 can be implemented as a computer system operable to communicate with a human using a coherent structure. The CA 420 employs a variety of communication mechanisms, including, for example, text, speech, graphics, haptics, gestures, and the like for communication on both the input and output channels. The CA 420 also employ various forms of natural language processing (NLP), which is a field of computer science, artificial intelligence, and computational linguistics concerned with the interactions between computers and humans using language.

In some embodiments of the invention, the CA 420 can be a computer-based Q&A module operable to solicit from User-A an answer to natural language questions presented by the CA 420. As a non-limiting example, the CA 420 can include all of the features and functionality of a DeepQA technology developed by IBM®. DeepQA is a Q&A system that can be operable to conduct an interrogation on any subject (e.g., obtaining User-A's feedback on presented EFs) by applying elements of natural language processing, machine learning, information retrieval, hypothesis generation, hypothesis scoring, final ranking, and answer merging to arrive at a conclusion (e.g., User-A liked or didn't like an EF, along with the reasons why User-A liked or didn't like an EF). Q&A systems such as IBM's DeepQA technology often use unstructured information management architecture (UIMA), which is a component software architecture for the development, discovery, composition, and deployment of multi-modal analytics for the analysis of unstructured information and its integration with search technologies developed by IBM®.

Continuing with the methodology 430 shown in FIG. 4B, from block 436 the methodology 430 moves to decision block 438 to determine whether or not the feedback generated at block 436 indicates that the EF presented to User-A is acceptable to User-A. If the answer to the inquiry at decision block 438 is yes, the methodology 430 moves to block 446 and ends. If the answer to the inquiry at decision block 438 is no, the methodology 430 moves to decision block 440 to determine whether or not there are more EFs (e.g., more options in the explainers repository 240 and/or the visualizations repository 250). If the answer to the inquiry at decision block 440 is yes, the methodology 430 returns to block 434 and generates a next EF. If the answer to the inquiry at decision block 440 is no, the methodology 430 moves to block 442 and evaluates the EFs that were found not acceptable at prior iterations of decision block 438 to determine the most acceptable (e.g., based on a scoring system) from that group and uses the "most acceptable" as the best EF option and uses that EF format for User-A. The methodology 430 moves to block 444 and issues an error notification. The methodology 430 then moves to block 446 and ends.

As previously noted, FIG. 5 depicts a portion of the system 100 where the explanation generator 220 (shown in FIG. 1) is implemented as an explanation generator 220A operable to include the ML model 520. As shown, the ML model 520 can be trained using the training data 510 and data from the user feedback database 230. The training data 510 includes information of applications 512, information of recommendations 514, information of explanations 516, and information of users (statically generated) 518, configured and arranged as shown. In accordance with aspects of the invention, the ML model 520 is trained to predict or generate the EF predictions 530 that the explanation generator 220A will use to search and select options from the explainers repository 240 and/or the visualizations repository 250.

In some embodiments of the invention, the ML model 250 can be generated using ML algorithms implemented as a CMAB (contextual multi-armed bandit) algorithm. CMAB algorithms are a form of reinforcement learning. In general, reinforcement learning techniques can be categorized as behavioral learning models. The reinforcement learning algorithm receives feedback from the analysis of the data so the user is guided to the best outcome. Reinforcement learning differs from other types of supervised learning because the system isn't trained with the sample data set. Rather, the system learns through trial and error. Therefore, a sequence of successful decisions will result in the process being "reinforced" because it best solves the problem at hand.

In general, a CMAB algorithm is an online learning solution that chooses, based on a given context (side information), an action from a set of possible actions in order to maximize the total payoff of the chosen actions. The payoff depends on both the action chosen and the context. In embodiments of the invention, any combination of the natural language explanation components from the explainers repository 240 and the visualization explanation components from the visualizations repository 250 can be considered an "action." The training data 510 and the data from the user feedback database 230 can be modeled as "context" of the CMAB algorithm. In embodiments of the invention, any feedback a user provides related to the context can be stored as part of context data. For example, if a user does not like a visual explanation for some specific recommended items, this can be stored as part of context data so that the learner component of the CMAB algorithm can use it. Users can score the presented explanation, and this score can be considered as the reward/payoff for the CMAB algorithm.

Figure 6:
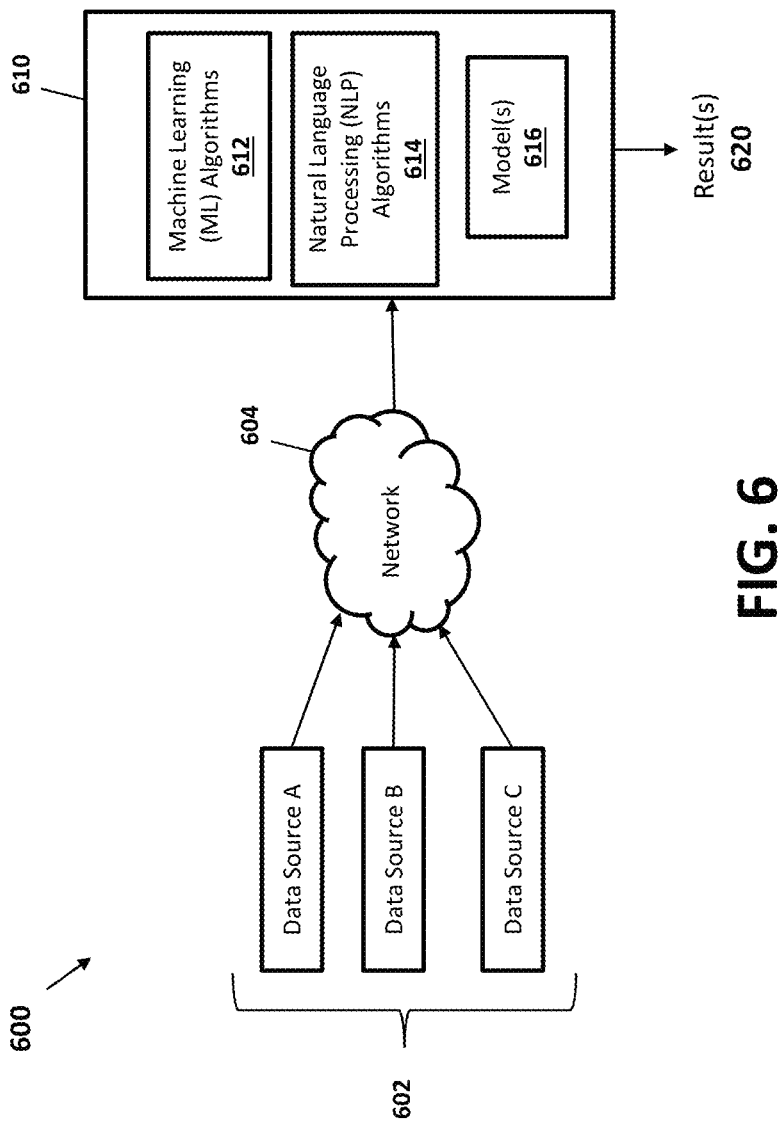
FIG. 6 depicts a machine learning system that can be utilized to implement aspects of the invention.
Figure 7:
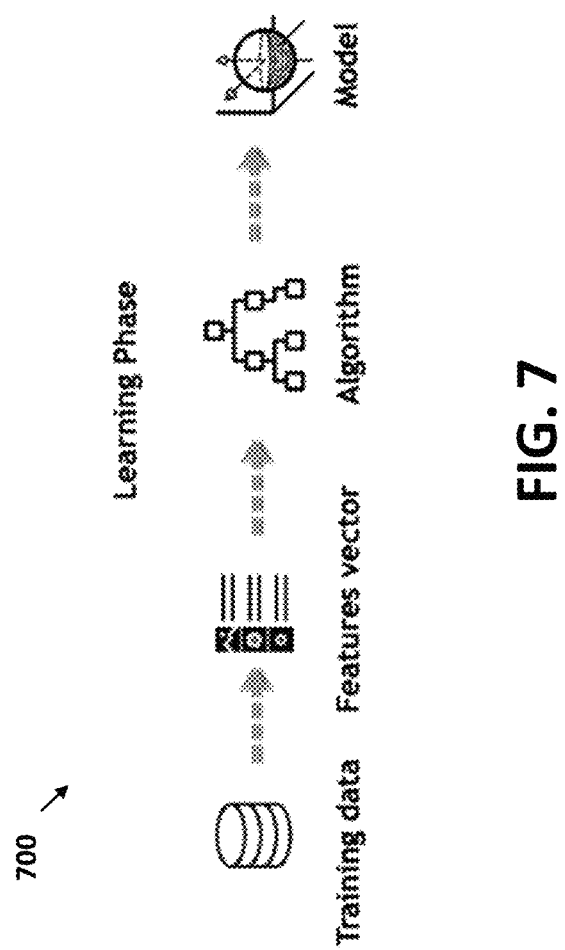
FIG. 7 depicts a learning phase that can be implemented by the machine learning system shown in FIG. 6.

Additional options for implementing the various ML algorithms and models used in connection with embodiments of the invention are depicted in FIGS. 6 and 7. Machine learning models configured and arranged according to embodiments of the invention will be described with reference to FIG. 6. Detailed descriptions of an example computing environment 800 and network architecture capable of implementing embodiments of the invention described herein will be provided with reference to FIG. 8.

FIG. 6 depicts a block diagram showing a classifier system 600 capable of implementing various aspects of the invention described herein. More specifically, the functionality of the system 600 is used in embodiments of the invention to generate various models and/or sub-models that can be used to implement computer functionality in embodiments of the invention. The system 600 includes multiple data sources 602 in communication through a network 604 with a classifier 610. In some aspects of the invention, the data sources 602 can bypass the network 604 and feed directly into the classifier 610. The data sources 602 provide data/information inputs that will be evaluated by the classifier 610 in accordance with embodiments of the invention. The data sources 602 also provide data/information inputs that can be used by the classifier 610 to train and/or update model(s) 616 created by the classifier 610. The data sources 602 can be implemented as a wide variety of data sources, including but not limited to, sensors configured to gather real time data, data repositories (including training data repositories), and outputs from other classifiers. The network 604 can be any type of communications network, including but not limited to local networks, wide area networks, private networks, the Internet, and the like.

Figure 8:
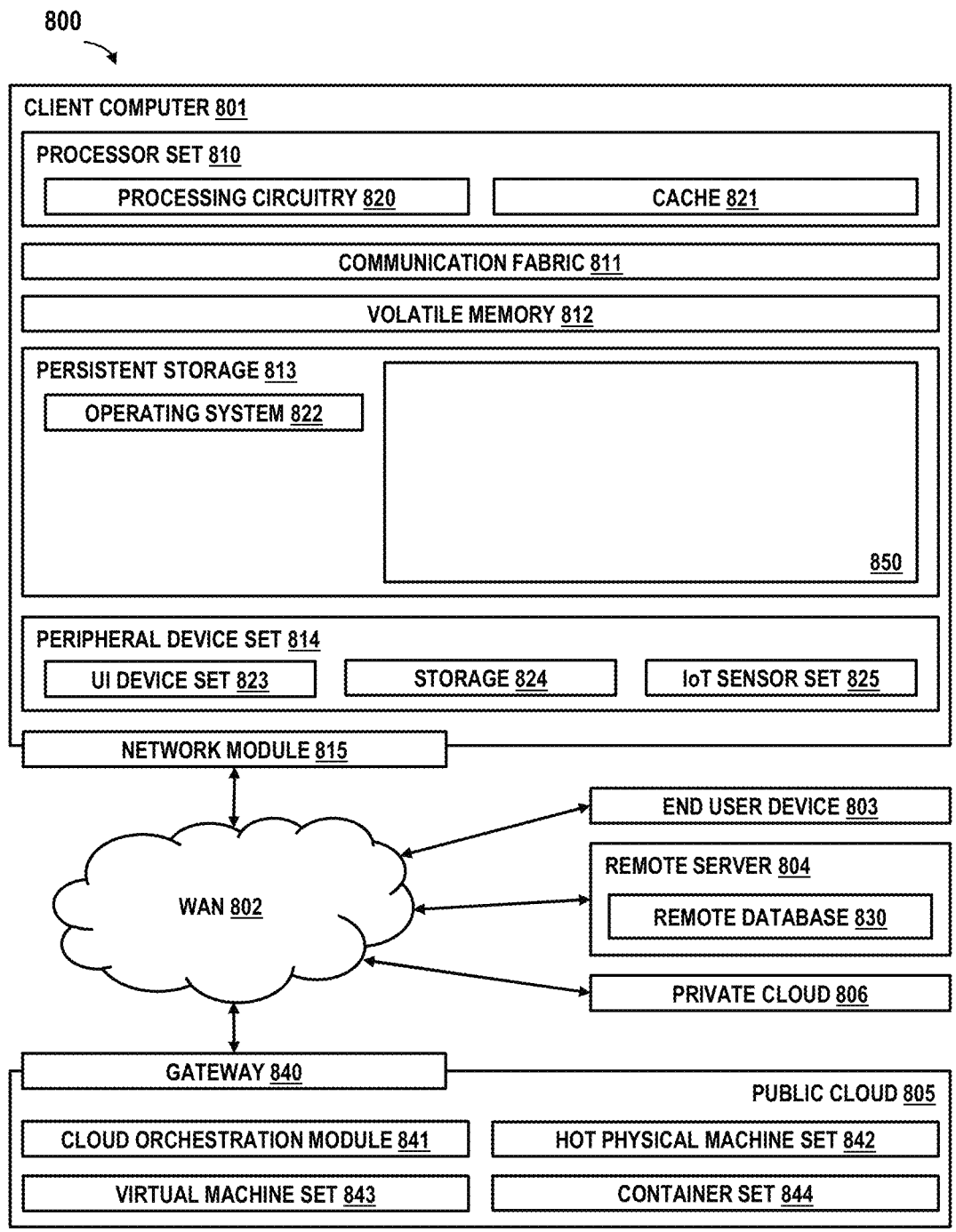
FIG. 8 depicts details of an exemplary computing environment operable to implement embodiments of the invention.

The classifier 610 can be implemented as algorithms executed by a programmable computer such as the computing environment 800 (shown in FIG. 8). As shown in FIG. 6, the classifier 610 includes a suite of machine learning (ML) algorithms 612; natural language processing (NLP) algorithms 614; and model(s) 616 that are relationship (or prediction) algorithms generated (or learned) by the ML algorithms 612. The algorithms 612, 614, 616 of the classifier 610 are depicted separately for ease of illustration and explanation. In embodiments of the invention, the functions performed by the various algorithms 612, 614, 616 of the classifier 610 can be distributed differently than shown. For example, where the classifier 610 is configured to perform an overall task having sub-tasks, the suite of ML algorithms 612 can be segmented such that a portion of the ML algorithms 612 executes each sub-task and a portion of the ML algorithms 612 executes the overall task. Additionally, in some embodiments of the invention, the NLP algorithms 614 can be integrated within the ML algorithms 612.

The NLP algorithms 614 includes text recognition functionality that allows the classifier 610, and more specifically the ML algorithms 612, to receive natural language data (e.g., text written as English alphabet symbols) and apply elements of language processing, information retrieval, and machine learning to derive meaning from the natural language inputs and potentially take action based on the derived meaning. The NLP algorithms 614 used in accordance with aspects of the invention can also include speech synthesis functionality that allows the classifier 610 to translate the result(s) 620 into natural language (text and audio) to communicate aspects of the result(s) 620 as natural language communications.

The NLP and ML algorithms 614, 612 receive and evaluate input data (i.e., training data and data-under-analysis) from the data sources 602. The ML algorithms 612 include functionality that is necessary to interpret and utilize the input data's format. For example, where the data sources 602 include image data, the ML algorithms 612 can include visual recognition software configured to interpret image data. The ML algorithms 612 apply machine learning techniques to received training data (e.g., data received from one or more of the data sources 602) in order to, over time, create/train/update one or more models 616 that model the overall task and the sub-tasks that the classifier 610 is designed to complete.

Referring now to FIGS. 6 and 7 collectively, FIG. 7 depicts an example of a learning phase 700 performed by the ML algorithms 612 to generate the above-described models 616. In the learning phase 700, the classifier 610 extracts features from the training data and converts the features to vector representations that can be recognized and analyzed by the ML algorithms 612. The feature vectors are analyzed by the ML algorithm 612 to "classify" the training data against the target model (or the model's task) and uncover relationships between and among the classified training data. Examples of suitable implementations of the ML algorithms 612 include but are not limited to neural networks, support vector machines (SVMs), logistic regression, decision trees, hidden Markov Models (HMMs), etc. The learning or training performed by the ML algorithms 612 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 610 and the ML algorithms 612. Unsupervised learning can utilize additional learning/training methods including, for example, clustering, anomaly detection, neural networks, deep learning, and the like.

When the models 616 are sufficiently trained by the ML algorithms 612, the data sources 602 that generate "real world" data are accessed, and the "real world" data is applied to the models 616 to generate usable versions of the results 620. In some embodiments of the invention, the results 620 can be fed back to the classifier 610 and used by the ML algorithms 612 as additional training data for updating and/or refining the models 616.

In aspects of the invention, the ML algorithms 612 and the models 616 can be configured to apply confidence levels (CLs) to various ones of their results/determinations (including the results 620) in order to improve the overall accuracy of the particular result/determination. When the ML algorithms 612 and/or the models 616 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 610 can be configured to apply confidence levels (CLs) to the results 620. When the classifier 610 determines that a CL in the results 620 is below a predetermined threshold (TH) (i.e., CL<TH), the results 620 can be classified as sufficiently low to justify a classification of "no confidence" in the results 620. If CL>TH, the results 620 can be classified as sufficiently high to justify a determination that the results 620 are valid. Many different predetermined TH levels can be provided such that the results 620 with CL>TH can be ranked from the highest CL>TH to the lowest CL>TH.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 8 depicts an example computing environment 800 that can be used to implement aspects of the invention. Computing environment 800 contains an example of an environment for the execution of at least some of the computer code involved in performing the inventive methods, such as new personalized and context-aware explanation format generation code 850. In addition to block 850, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 850, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 850 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 850 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of 8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
executing, using an interaction manager module of a recommender system, user feedback operations comprising receiving and storing user feedback on explanation formats of recommendation-explanation pairs generated by a recommender of the recommender system;
wherein the recommendation-explanation pairs comprise a first recommendation-explanation pair; and
determining, using an explanation generator module of the recommender system, a predicted explanation format of the first recommendation-explanation pair;
wherein the explanation generator module comprises a machine learning model trained based at least in part on the user feedback on the explanation formats of the recommendation-explanation pairs generated by the recommender.

2. The computer-implemented method of claim 1, wherein the predicted explanation format of the first recommendation-explanation pair is based at least in part on a prediction, using the machine learning model, that a user of the recommender system will accept the predicted explanation format.

3. The computer-implemented method of claim 1, wherein the predicted explanation format of the first recommendation-explanation pair is based at least in part on a prediction that a user of the recommender system will act on a recommendation portion of the first recommendation-explanation pair.

4. The computer-implemented method of claim 1 further comprising using the predicted explanation format type to generate a personalized combination output associated with the first recommendation-explanation pair, wherein the personalized combination output comprises an explanation format and an explanation component.

5. The computer-implemented method of claim 1, wherein:
the recommendation-explanation pairs are associated with one or more applications; and
the machine learning model is further trained based at least in part on context information comprising:
information of a plurality of recommendations associated with the one or more applications;
information of the one or more applications; and
information of a user of the recommendation system.

6. The computer-implemented method of claim 4, wherein the explanation component comprises one or more of natural language text, a diagram, a chart, a table, video, and audio.

7. The computer-implemented method of claim 1, wherein the interaction manager module comprises a conversational agent configured to actively solicit the user feedback from a user of the recommender system by executing a conversational loop between the conversational agent and a user of the recommendation system.

8. A computer system comprising a processor system communicatively coupled to a memory, wherein the processor system is operable to perform processor system operations comprising:
executing, using an interaction manager module of a recommender system, user feedback operations comprising receiving and storing user feedback on explanation formats of recommendation-explanation pairs generated by a recommender of the recommender system;
wherein the recommendation-explanation pairs comprise a first recommendation-explanation pair; and
determining, using an explanation generator module of the recommender system, a predicted explanation format of the first recommendation-explanation pair;
wherein the explanation generator module comprises a machine learning model trained based at least in part on the user feedback on the explanation formats of the recommendation-explanation pairs generated by the recommender.

9. The computer system of claim 8, wherein the predicted explanation format of the first recommendation-explanation pair is based at least in part on a prediction, using the machine learning model, that a user of the recommender system will accept the predicted explanation format.

10. The computer system of claim 8, wherein the predicted explanation format of the first recommendation-explanation pair is based at least in part on a prediction that a user of the recommender system will act on a recommendation portion of the first recommendation-explanation pair.

11. The computer system of claim 8, wherein:
the processor system operations further comprise using the predicted explanation format type to generate a personalized combination output associated with the first recommendation-explanation pair; and
the personalized combination output comprises an explanation format and an explanation component.

12. The computer system of claim 8, wherein:
the recommendation-explanation pairs are associated with one or more applications; and
the machine learning model is further trained based at least in part on context information comprising:
information of a plurality of recommendations associated with the one or more applications;
information of the one or more applications; and
information of a user of the recommendation system.

13. The computer system of claim 11, wherein the explanation component comprises one or more of natural language text, a diagram, a chart, a table, video, and audio.

14. The computer system of claim 13, wherein the interaction manager module comprises a conversational agent configured to actively solicit the user feedback from a user of the recommender system by executing a conversational loop between the conversational agent and a user of the recommendation system.

15. A computer program product comprising a computer readable program stored on a computer readable storage medium, wherein the computer readable program, when executed on a processor system, causes the processor system to perform processor system operations comprising:
executing, using an interaction manager module of a recommender system, user feedback operations comprising receiving and storing user feedback on explanation formats of recommendation-explanation pairs generated by a recommender of the recommender system;
wherein the recommendation-explanation pairs comprise a first recommendation-explanation pair; and
determining, using an explanation generator module of the recommender system, a predicted explanation format of the first recommendation-explanation pair;
wherein the explanation generator module comprises a machine learning model trained based at least in part on the user feedback on the explanation formats of the recommendation-explanation pairs generated by the recommender.

16. The computer program product of claim 15, wherein the predicted explanation format of the first recommendation-explanation pair is based at least in part on a prediction, using the machine learning model, that a user of the recommender system will accept the predicted explanation format.

17. The computer program product of claim 15, wherein the interaction manager module comprises a conversational agent configured to actively solicit the user feedback from a user of the recommender system by executing a conversational loop between the conversational agent and a user of the recommendation system.

18. The computer program product of claim 15, wherein:
the processor system operations further comprise using the predicted explanation format type to generate a personalized combination output associated with the first recommendation-explanation pair; and
the personalized combination output comprises an explanation format and an explanation component.

19. The computer program product of claim 15, wherein:
the recommendation-explanation pairs are associated with one or more applications; and
the machine learning model is further trained based at least in part on context information comprising:
information of a plurality of recommendations associated with the one or more applications;
information of the one or more applications; and
the information of a user of the recommendation system.

20. The computer program product of claim 18, wherein the explanation component comprises one or more of natural language text, a diagram, a chart, a table, video, and audio.

\* \* \* \* \*